United States Patent
Mans et al.

(10) Patent No.: US 9,795,005 B2
(45) Date of Patent: Oct. 17, 2017

(54) APPARATUS ARRANGED WITH PLURAL DIVERSE-TYPE DETECTORS FOR CONTROLLING AN ELECTRICAL LOAD

(71) Applicant: C.P. Electronics Limited, London (GB)

(72) Inventors: Paul Mans, Harpenden (GB); Merlin Miler, Lewes (GB)

(73) Assignee: Legrand Electrics Limited (GB)

( * ) Notice: Subject to any disclaimer, the term of this patent is extended or adjusted under 35 U.S.C. 154(b) by 0 days.

(21) Appl. No.: 15/022,592

(22) PCT Filed: Oct. 29, 2014

(86) PCT No.: PCT/GB2014/053216
§ 371 (c)(1),
(2) Date: Mar. 17, 2016

(87) PCT Pub. No.: WO2015/063479
PCT Pub. Date: May 7, 2015

(65) Prior Publication Data
US 2016/0234916 A1    Aug. 11, 2016

(30) Foreign Application Priority Data
Oct. 29, 2013 (GB) .................................. 1319092.1

(51) Int. Cl.
*H05B 37/02* (2006.01)
(52) U.S. Cl.
CPC .......... *H05B 37/0227* (2013.01); *Y02B 20/44* (2013.01)
(58) Field of Classification Search
CPC ................................................. H05B 37/0227
(Continued)

(56) References Cited

U.S. PATENT DOCUMENTS 6,486,778 B2 * 11/2002 Mahler ............ G08B 13/19697
250/214 AL
7,498,576 B2 * 3/2009 Micko ...................... G01J 1/46
250/330
(Continued)

FOREIGN PATENT DOCUMENTS

DE    4308983 A1    9/1994
EP    2060857 A1    5/2009
(Continued)

OTHER PUBLICATIONS

PCT International Search Report dated Jan. 27, 2015, with PCT Written Opinion of the International Search Authority; 10 pages.
(Continued)

*Primary Examiner* — Thuy Vinh Tran
(74) *Attorney, Agent, or Firm* — Seyfarth Shaw LLP

(57) ABSTRACT

Apparatus for controlling an electrical load, in particular for the environmental control of a room, comprises an occupancy sensor (5) comprising a thermopile array. The occupancy sensor is responsive to the presence of a person within a detection field (13) of the occupancy sensor (5). The apparatus further comprises a movement sensor (6) responsive to the movement of a person within a detection field of the movement sensor and a controller arranged to receive detection signals from the occupancy sensor (5) and the movement sensor (6) and to generate a control signal for the electrical load in response to the received detection signals. The controller is configured to generate a first control signal in response to detection of a person by the movement sensor (6) and to modify the first control signal to a second control signal in response to detection of a person by the occupancy sensor (5). The controller may be user-programmable and be configured to store data indicative of at least one priority location within the detection field of the occupancy sensor (5) by receiving from an input device an input signal while
(Continued)

receiving from the occupancy sensor (5) a detection signal indicative of the presence of a person at the priority location. The controller configured subsequently to generate the second control signal in response to a detection signal from the occupancy sensor (5) indicative of the detection of a person at the priority location.

22 Claims, 1 Drawing Sheet

(58) Field of Classification Search
USPC .......................... 315/149, 291, 308; 340/567
See application file for complete search history.

(56) References Cited

U.S. PATENT DOCUMENTS

| | | | |
|---|---|---|---|
| 7,985,953 B2* | 7/2011 | Luterotti | G01J 5/0022 250/336.1 |
| 2009/0143915 A1 | 6/2009 | Dougan et al. | |
| 2012/0306377 A1 | 12/2012 | Igaki et al. | |
| 2013/0181617 A1* | 7/2013 | Maddox | H05B 37/0227 315/159 |

FOREIGN PATENT DOCUMENTS

| | | |
|---|---|---|
| GB | 2242515 A | 10/1991 |
| GB | 2491895 A | 12/2012 |
| JP | 2005283214 A | 10/2005 |
| KR | 20080111623 A | 12/2008 |

OTHER PUBLICATIONS

United Kingdom Combined Search and Examination Report Under Sections 17 and 18 (3) dated Mar. 12, 2014; 6 pages.
United Kingdom Intellectual Property Office Search Report Under Section 17(6) dated Jul. 24, 2014; 2 pages.
United Kingdom Intellectual Property Office Examination Report Under Section 18(3), dated Dec. 30, 2015; 3 pages.
United Kingdom Intellectual Property Office Combined Search and Examination Report under Sections 17 and 18(3) (further), dated Dec. 30, 2015; 5 pages.

* cited by examiner

APPARATUS ARRANGED WITH PLURAL DIVERSE-TYPE DETECTORS FOR CONTROLLING AN ELECTRICAL LOAD

CROSS REFERENCE TO RELATED APPLICATIONS

The present application is a national stage of International Application No. PCT/GB2014/053216, filed Oct. 29, 2014, which claims priority to GB 1319092.1, filed Oct. 29, 2013, the disclosures of which are incorporated herein by reference.

This invention relates to apparatus for controlling an electrical load, in particular for the environmental control of a room, such as the control of a lighting system.

BACKGROUND

The control of electrical loads to ensure they are only active when required is a known problem. Solutions to this problem are advantageous in minimising the cost and environmental effect of powering such loads. For example, in lighting control systems there is a desire to only turn on the lights when the space to be illuminated is occupied. A common solution involves a passive infra-red (PIR) sensor used to detect the movement of a person within range of the sensor. A living person is warm and therefore emits infra-red (IR) radiation. The PIR sensor typically features a lens which focuses the incident IR radiation onto one of a plurality of sensitive elements behind the lens. Adjacent sections of the lens focus the IR radiation to different IR-receptive elements. By detecting relative changes in the output signals from the sensitive elements, PIR sensors can determine movement of a person within the detection field of the sensor. However, a PIR sensor of this type is unable to detect a person that is not moving.

An alternative solution uses a microwave sensor which emits radiation at microwave frequencies and detects reflected radiation from objects within the detection range of the sensor. For moving objects the radiation is reflected at a different frequency to the incident radiation due to the Doppler effect. By comparing the frequency of the emitted radiation to that of the reflected radiation, movement within the detection range of the microwave sensor can be detected. Microwave sensors typically have longer ranges than PIR sensors. Without expensive modification, microwave sensors are not suitable for detecting the presence of a person who is not moving.

Ultrasounds sensors can also be used to detect the presence of a moving person. In a similar way to microwave sensors, the ultrasound sensor transmits ultrasound, and the frequency of the received echo can be used to determine the presence of a moving target. As with the PIR and microwave sensors, ultrasound sensors are also not generally suitable for detecting the presence of a person who is not moving.

Recently, thermopile array sensors have been developed. A thermopile array is made up of several thermocouples. A thermocouple uses the fact that a temperature difference between two dissimilar conductors in contact will produce a potential difference across the junction. A thermopile uses this principle to generate a potential difference in response to incident infra-red (IR) radiation on a contact plate, representing the hot side of the junction. The other conductor, which is in contact with the hot side, is shielded from the incident radiation and so does not heat up. By placing the hot side in a vacuum behind an IR-transparent lens, the device can be made more sensitive, since the heat does not dissipate through convection. IR radiation from different areas can be directed towards different thermopiles in the array. In this way, a 'pixel' corresponding to the area from which the IR radiation originated can be determined. Unfortunately, thermopile arrays typically have a detection range shorter than current sensors of other types. In addition, their response times are relatively long, which makes them difficult to use in many lighting applications.

BRIEF SUMMARY OF THE DISCLOSURE

In accordance with the present inventions there is provided apparatus for controlling an electrical load, in particular for the environmental control of a room. The apparatus comprises an occupancy sensor comprising a thermopile array. The occupancy sensor is responsive to the presence of a person within a detection field of the occupancy sensor. The apparatus further comprises a movement sensor responsive to the movement of a person within a detection field of the movement sensor and a controller arranged to receive detection signals from the occupancy sensor and the movement sensor and to generate a control signal for the electrical load in response to the received detection signals. The controller is configured to generate a first control signal in response to detection of a person by the movement sensor and to modify the first control signal to a second control signal in response to detection of a person by the occupancy sensor.

Thus, in accordance with the present invention, the occupancy sensor and the movement sensor work together to provide improved person detection within the detection field of the apparatus. The thermopile occupancy sensor alone may be too slow to respond to the sudden presence of a person and the range of the occupancy sensor is too short to cover large areas. The movement sensor alone will not detect the presence of a stationary person, which can cause false detection, such as switching off lights when is person is seated at a desk. By combining two types of sensors in a single system and using the information from both sensors to generate control signals for the electrical load, improved person detection can be achieved.

In one example, the first control signal can be generated to turn on lighting when a person enters a room and the second control signal can be generated to maintain the lighting in the room when the person becomes stationary, for example seated.

The movement sensor may comprise at least one of: a microwave sensor; a passive infrared sensor; an ultrasound sensor. Other suitable movement sensors may be used. In the presently preferred embodiment, a microwave sensor is used, which has the advantage of a relatively long range and reliable movement detection.

The detection field of the movement sensor and the detection field of the occupancy sensor may overlap. Thus, both sensors may cover the same or some of the same area. In embodiments of the invention, the detection field of the occupancy sensor is within the detection field of the movement sensor. In this case, the occupancy sensor may cover an area, such as a workstation or bed, and the movement sensor may be used to identify movement of a person into this area or at the periphery of the area.

Typically, the detection field of the movement sensor has a greater range than the detection field of the occupancy sensor. This is advantageous in that the movement sensor can be used to detect movement in corridors and walkways around the detection field of the occupancy sensor.

In embodiments of the invention, the first control signal activates the electrical load and the second control signal maintains the electrical load in an active state in response to continued detection of a person by the occupancy sensor. Thus, a more responsive movement sensor can be used to activate the electrical load quickly, while the occupancy sensor ensures that the load remains active even if the person becomes stationary.

The first control signal may activate the electrical load at a first level and the second control signal may activate the electrical load at a second level. In this case, for example, detection of a person by the movement sensor may activate ambient lighting at a relatively low while the person moves through the room. If the person remains in the room, as indicated by the occupancy sensor, the ambient lighting level may be increased.

The first control signal may activate the electrical load in a first region of the room and the second control signal may activate or maintain the electrical load in a second region of the room. In this case, for example, the detection of a person by the movement sensor may activate ambient lighting in corridors and walkways while the person moves through the room. If the person remains in the room, as indicated by the occupancy sensor, lighting may be activated at the location of the person, such as a desk or workstation, determined by the occupancy sensor.

The second region may be a sub-region of the first region. In this case, for example, detection of a person by the movement sensor may activate ambient lighting at a low level across the whole room while the person moves through the room. If the person remains in the room, as indicated by the occupancy sensor, lighting may be activated at a higher level at the location of the person, such as a desk or workstation, determined by the occupancy sensor.

The first region may correspond substantially to the detection field of the movement sensor and the second region may correspond substantially to the detection field of the occupancy sensor.

The apparatus may comprise a housing. At least the occupancy sensor and the movement sensor may be provided in the housing. In this way, the apparatus can be provided as a single unit with both sensors. The controller may also be provided in the housing. Alternatively, the movement sensor, occupancy sensor and/or the controller may be distributed throughout the space to be monitored. Multiple movement sensors and occupancy sensors may be provided. The multiple sensors may all be connected to the same controller. The controller may be a dedicated controller for the sensors or may be part of a lighting control system, building management system or other control system.

In embodiments of the invention, the detection signal from the occupancy sensor is indicative of the location of a person within the detection field of the occupancy sensor and the controller is configured to generate the second control signal in dependence on the location indicated by the detection signal. For example, the occupancy sensor may provide a detection signal indicative of the thermopile element in the array that is detecting a person. This allows a different second control signal to be generated for one location compared to another, such as providing desk lighting when a person is detected at a desk location and ambient lighting at other locations in the detection field. In a domestic setting, the second control signal could provide different lighting when occupancy of a sofa or couch is detected compared to occupancy of a dining table.

The controller may be user-programmable. The apparatus may comprise an input device for programming the controller. The controller may be configured to store data indicative of at least one priority location within the detection field of the occupancy sensor by receiving from the input device an input signal while receiving from the occupancy sensor a detection signal indicative of the presence of a person at the priority location. The controller may be configured subsequently to generate the second control signal in response to a detection signal from the occupancy sensor indicative of the detection of a person at the priority location. In this way, priority locations can be identified easily to the controller and appropriate second control signals can be assigned to the priority locations. It is also possible for the controller to be configured to ignore particular locations within the detection field of the occupancy sensor in the same way, for example where these locations may contain electrical equipment that could trigger a false occupancy detection.

This is in itself believed to be novel and thus viewed from a further aspect the invention provides apparatus for controlling an electrical load, in particular for the environmental control of a room, the apparatus comprising an occupancy sensor comprising a thermopile array, the occupancy sensor being responsive to the presence of a person within a detection field of the occupancy sensor, a user-programmable controller arranged to receive a detection signal from the occupancy sensor and to generate a control signal for the electrical load, and an input device. The controller is configured to store data indicative of at least one priority location within the detection field of the occupancy sensor by receiving from the input device an input signal while receiving from the occupancy sensor a detection signal indicative of the presence of a person at the priority location. The controller is configured subsequently to generate the control signal in response to a detection signal from the occupancy sensor indicative of the detection of a person at the priority location.

In a simple embodiment, the input device comprises an infra-red receiver. The user may be provided with a corresponding infra-red transmitter. Other input devices are possible.

In embodiments of the invention, the controller is configured to store data indicative of at least one priority location within the detection field of the occupancy sensor and the controller is configured subsequently to generate the second control signal in response to a detection signal from the occupancy sensor indicative of the detection of a person at the priority location. In such embodiments, the controller is configured to store the data indicative of the priority location in response to repeated detection by the occupancy sensor of a person at the priority location. In this way, the controller is able to "learn" the priority locations within the detection field of the occupancy sensor and respond to the detection of a person in these locations.

Viewed from a further aspect therefore the invention provides apparatus for controlling an electrical load, in particular for the environmental control of a room. The apparatus comprises an occupancy sensor comprising a thermopile array, the occupancy sensor being responsive to the presence of a person within a detection field of the occupancy sensor and a controller arranged to receive a detection signal from the occupancy sensor and to generate a control signal for the electrical load. The controller is configured to store data indicative of at least one priority location within the detection field of the occupancy sensor and the controller is configured subsequently to generate the second control signal in response to a detection signal from the occupancy sensor indicative of the detection of a person at the priority location, The controller is configured to store the data indicative of the priority location in response to repeated detection by the occupancy sensor of a person at the priority location.

The repeated detection by the occupancy sensor may comprise continuous detection by the occupancy sensor of a person at the priority location over a predetermined period of time. For example, the occupancy sensor may detect a person sitting at a desk for an extended period of time, in which case the location of the desk may be stored as a priority location. Alternatively or in addition, the repeated detection by the occupancy sensor may comprise continual detection by the occupancy sensor of a person at the priority location over a predetermined period of time. For example, the occupancy sensor may detect a person sitting at a desk several times during the course of a day or even over several days, in which case the location of the desk may be stored as a priority location.

In the presently preferred embodiment, the electrical load is a lighting load, in particular a lighting system. However, the electrical load may comprise an environmental heating and/or cooling system, such as an air conditioning system.

Other applications of this sensing technology are also possible. In particular, the electrical load may be simply an alarm or indicator. For example, the sensing technology may be used to determine the occupancy of seats in an office, a waiting room, a theatre, a cinema, or the like. Similarly, the sensing technology may be used to determine the occupancy of beds in a hotel, residential care home, a hospital or the like. The sensing system of the present invention is of application in any situation where it is important to identify occupancy of particular locations in a space.

Viewed from a broad aspect therefore the invention provides apparatus for detecting occupancy comprising an occupancy sensor comprising a thermopile array, the occupancy sensor being responsive to the presence of at least one person within a detection field of the occupancy sensor and a controller arranged to receive a detection signal from the occupancy sensor and to generate a control signal in response to the received detection signal, wherein the controller is configured to store data indicative of the priority at least one location within the detection field of the occupancy sensor and is configured subsequently to generate the control signal in response to a detection signal indicative of the detection of a person at the location in dependence on the stored priority.

BRIEF DESCRIPTION OF THE DRAWINGS

Embodiments of the invention are further described hereinafter with reference to the accompanying drawings, in which.

DETAILED DESCRIPTION

Figure 1:
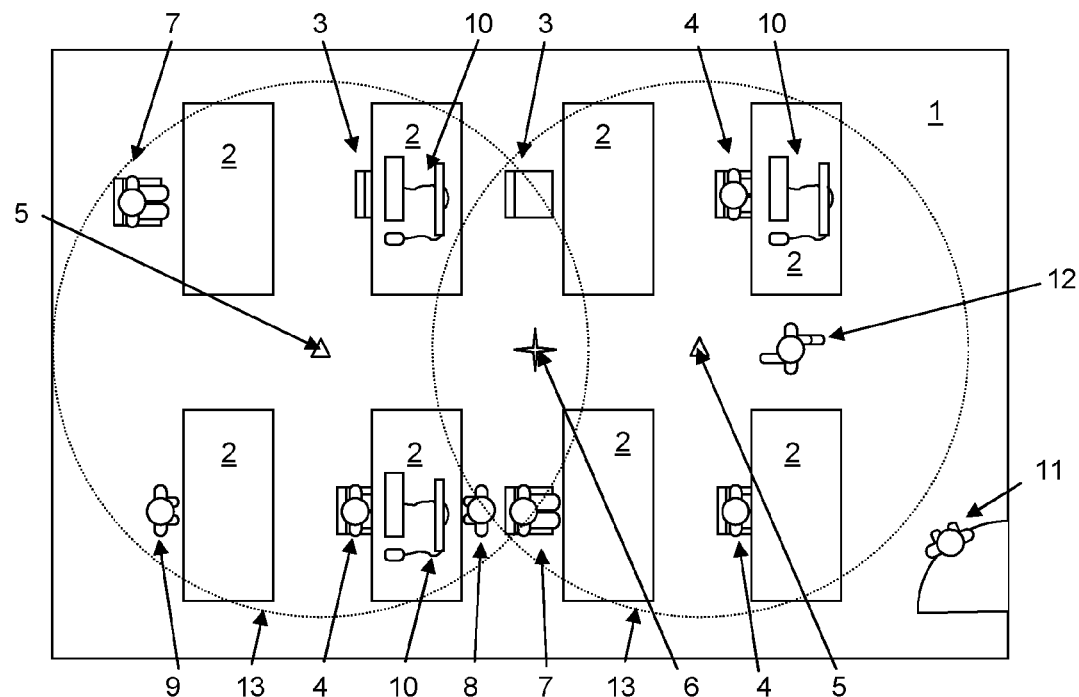
FIG. 1 illustrates an application of an embodiment of the present invention.

As shown in FIG. 1, a sensor system according to an embodiment of the present invention is used to control a lighting system for a room 1. The room contains a series of desks or workstations 2 and above each of the desks 2 are lights (not shown) for illuminating the desks 2. The lights can be individually controlled by the sensor system. In the instantaneous situation shown in FIG. 1 people 4, 7 are seated at some of the desks 2. At other desks 2, people 8, 9 are standing. Some of the desks 2 have computer equipment 10.

In accordance with the invention, the sensor system comprises a thermopile array 5 configured as an occupancy sensor sensitive to the presence of a person within the field of detection 13 of the occupancy sensor. In the embodiment of FIG. 1, the system comprises two such occupancy sensors. The system further comprises a microwave sensor 6 configured as a movement sensor, which is sensitive to a moving person within the field of detection of the movement sensor 6. In the case of FIG. 1, the field of detection of the movement sensor is the entire room 1. In this embodiment, the thermopile arrays 5 and microwave sensor 6 are provided and installed in separate housings, although both types of sensor may be combined in a single housing.

The thermopile array 5 is able to collect the IR radiation emitted from a human body, and so detect the presence of a person within its field of detection. The thermopile array 5 used as the occupancy sensor in the embodiment shown in FIG. 1 consists of 16×16 thermopile elements. Using this sensor 5, the approximate location of people within the detection range 13 of the thermopile array 5 can be determined by reference to the level of IR radiation detected by each element of the array.

The microwave sensor 6 detects moving objects within the field of detection of the sensor 6 by means of the Doppler shift in reflected microwave radiation. As shown in FIG. 1, the person 11 is outside the detection range 13 of the thermopile array 5, but will be detected by the microwave sensor 6 as they move. The microwave sensor has a larger detection area than the thermopile array 5, but is not able to determine the location from which the movement originates. Furthermore, when the movement stops, the microwave sensor 6 is unable to detect a person who is not moving. If a larger detection region is required, either for the occupancy sensor, the movement sensor, or both, then multiple occupancy sensors or movement sensors can be used, either as more sensors in the sensor system, or in the form of multiple sensor systems.

The system comprises a controller (not shown), which may be the lighting controller of the lighting system. The controller receives the detection signals from the occupancy sensors 5 and the movement sensor 6 and generates control signals to control the lighting system as will be described below.

Figure 2:
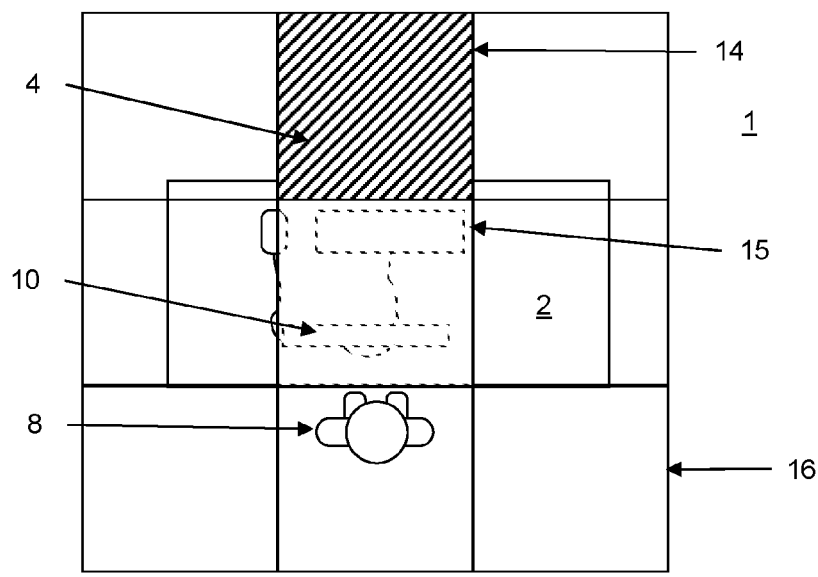
FIG. 2 illustrates an operation mode provided by embodiments of the present invention.

FIG. 2 shows schematically the detection field of a 3×3 grid of the pixels 16 which make up the thermopile array 5. In this example, the nine pixels of the grid cover a desk area. In an implementation of a 256 pixel sensor, each pixel typically covers an area of 0.25 m². However, in FIG. 2, for reasons of clarity, the coverage area of each pixel is represented as larger than in a typical implementation. The desk 2 has computer equipment 10 on it, which will become warm when in use, and so may register on the thermopile array 5. The sensor system can be configured to designate one of the grid of pixels 16 as a pixel to ignore 15 by calibrating the sensor system when the detection field is totally unoccupied. In this way, the sensor system will not use any readings from this pixel when determining whether the room 1 is empty.

The sensor system is also configured to differentiate between a person 4, 7, 9 working at the desk, and a person 8 who is standing at the desk temporarily. This is achieved by designating one of the grid of pixels 16 as a priority pixel 14, as will be described below.

One possible mode of operation for the sensor system will now be described. This relates to the sensor system used in a lighting control application, although the sensor system could equally be used to control other environmental conditions such as air temperature or air humidity.

In this embodiment, when the movement sensor 6 detects movement by a person, the lights in the detection range of the movement sensor (or a larger area) are switched on to a low level to illuminate the area. A low level may be, for example, 50% of maximum intensity. When the person passes into the detection range 13 of the occupancy sensor 5, they are now detected by both the occupancy sensor 5 and the movement sensor 6. As the person reaches and sits down at their desk, the occupancy sensor detects IR radiation emitted from the person in the location (priority pixel) previously indicated as corresponding to the desk, and the system enters a confirmation phase. If the IR radiation detected continues and does not move to another pixel of the occupancy sensor for a short time, for example three seconds, then the lights at and around the desk are increased in intensity to the appropriate level for working. The purpose of the confirmation phase is to differentiate between a person passing through the desk location and a person occupying the seat at the desk.

When the person leaves the desk, the thermopile element of the occupancy sensor 5 directed towards the desk will receive significantly less IR radiation. This low level of IR radiation intensity indicates the absence of a person. There is no longer a requirement to fully illuminate the area, and so the controller switches the lights in that region to low level, for example 50%.

When there is no movement detected using the movement sensor 6 and no hot spots above a pre-determined threshold detected by the occupancy sensor, the system may enter a time-out phase. On the expiry of the time-out of, for example 30 seconds, the lights are switched off. The lights may instead be switched to a third lower intensity level.

Although the operation of this embodiment has been described with reference to one desk representing a single designated area, there could be a number of different sensitive areas corresponding to other desks, for example, within the detection field of the occupancy sensor 6.

The priority locations within the detection field of occupancy sensor are programmable by the user. In accordance with a particularly simple programming regime, the controller is in data communication with a remote control, for example an infra-red remote control (not shown). The receiver for the remote control may be provided on the housing of the occupancy sensor 5. In order to identify a priority location to the controller, a user occupies that location, for example by sitting in a particular seat, and operates the remote control to indicate that a priority location should be recorded. On receipt of the signal from the remote control, the controller stores the detection signal from the occupancy sensor 5, which indicates those pixels of the array that represent the presence of a person and therefore occupancy. Subsequently, the controller can respond only to detected occupancy in the pixels which correspond to the priority location(s).

In the same way, it is possible for the user to programme locations which should be ignored by the controller. In this case, a different signal is communicated by the remote control, which indicates to the controller that the currently occupied locations should be ignored in future detection. Furthermore, it is possible for locations to be associated with different priorities or different lighting configurations.

If the desired priority location is not a single discrete location, but a region covering several elements in the thermopile array, then the signal from the remote control can be sustained whilst the user covers the desired region. The elements designated may relate to the areas visited by the user during this process. Alternatively, the elements designated may be the elements within the boundary formed by the areas visited by the user. In this way, larger regions can be specified, for example if the user wants the lights to remain on whilst they pace around an area.

The occupation of different priority locations may result in different behaviour by the controller. For example, in a university library, each of the study tables may have one priority, so that only lights for that particular study table are switched on when a person is present at the table. The presence of a person at the information desk in the library could cause a different behaviour where more or different lights are also switched on. This would be beneficial as it would inform everyone in the library that the information desk is now staffed. Instead of different lights being switched on, the priorities could instead result in differing intensities of the switched on lights.

Whilst the behaviour configuration has been described with reference to a remote control, it could instead be controlled using a graphical user interface where the user selects regions using the display instead of a signal from the remote control. The graphical user interface allows the user to configure more complicated modes of operation for the system, such as different behaviour at weekends or at different times in the day.

In addition to the active selection or de-selection of regions, the system can be configured to respond to usage levels. Where some parts of an area designated at a particular priority are never used, the area can be modified to deselect this element from the region. Conversely, when a person appears to be regularly traversing out of the pre-selected region, the region may be expanded to include this new area. The ability of the system to self-modify the region selection can be controlled depending on the priority selected for the region, with some priorities expressly forbidding the system from modifying the nominated regions itself.

When the system observes a near constant IR emission from a region for the whole day, this may be indicative of a piece of equipment instead of a human being. The system can be configured to automatically ignore regions which fit this, or similar, criteria.

The system may have a learning mode where the regions in which there are semi-continuous IR emissions are designated as priority regions, and those where the IR emissions are strictly continuous are designated as regions to ignore. This process could occur once at setup, and any time the configuration of the room changes.

This automatic configuration procedure works well in the case of single element region selection. Pacing areas or corridors of priority can be activated manually. If desired, these can be selected such that they do not get re-written every time the automated configuration procedure is initialised.

In addition to the behaviour being actively configured using the remote control and/or graphical user interface, there can be ambient light level detectors to determine how much, if any, extra light is required in the space.

Another application of at least one aspect of the present invention is in domestic monitoring. For an ill or infirm patient, the sensor system is able to monitor when a person gets out of bed on a particular day. The occupancy sensor can be located to monitor the occupancy of the bed. The movement sensor can be used to indicate changes in occupancy of the bed.

Many of these applications will require thresholds to be accurately set for the detection levels of the occupancy sensor. For example, a person coming into the room from outside on a cold day is likely to have cold outer layers on. As a result, much of the IR radiation the person is emitting by virtue of their body heat may be absorbed into the outer layers. Since these will not have heated up yet, most of this radiation will be absorbed into the outer layers and not get re-emitted in the direction of the thermopile array. However, the movement of the person will be detected by the microwave sensor. It is possible that a lower threshold in the winter months, or on colder days would partly combat this effect.

In summary, apparatus for controlling an electrical load, in particular for the environmental control of a room, comprises an occupancy sensor 5 comprising a thermopile array. The occupancy sensor is responsive to the presence of a person within a detection field 13 of the occupancy sensor 5. The apparatus further comprises a movement sensor 6 responsive to the movement of a person within a detection field of the movement sensor and a controller arranged to receive detection signals from the occupancy sensor 5 and the movement sensor 6 and to generate a control signal for the electrical load in response to the received detection signals. The controller is configured to generate a first control signal in response to detection of a person by the movement sensor 6 and to modify the first control signal to a second control signal in response to detection of a person by the occupancy sensor 5. The controller may be user-programmable and be configured to store data indicative of at least one priority location within the detection field of the occupancy sensor 5 by receiving from an input device an input signal while receiving from the occupancy sensor 5 a detection signal indicative of the presence of a person at the priority location. The controller configured subsequently to generate the second control signal in response to a detection signal from the occupancy sensor 5 indicative of the detection of a person at the priority location.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus for controlling an electrical load for the environmental control of a room, comprising:
    an occupancy sensor including a thermopile array and an occupancy detection field, the occupancy sensor is adapted to detect the presence of a person within the occupancy detection field;
    a movement sensor including a movement detection field, the movement sensor is adapted to detect a movement of the person within the movement detection field; and
    a controller adapted to receive respective detection signals from the occupancy and movement sensors and generate a control signal for the electrical load in response to the received detection signals,
    wherein the controller is adapted to generate a first control signal in response to detection of the person by the movement sensor and modify the first control signal to a second control signal in response to detection of the person by the occupancy sensor.

2. The apparatus as claimed in claim 1, wherein the movement sensor is selected from the group consisting of a microwave sensor; a passive infrared sensor; and an ultrasound sensor.

3. The apparatus as claimed in claim 1, wherein the movement detection field and the occupancy detection field overlap.

4. The apparatus as claimed in claim 3, wherein the occupancy detection field is within the movement detection field.

5. The apparatus as claimed in claim 1, wherein the movement detection field has a movement detection range that is greater than an occupancy detection range of the occupancy detection field.

6. The apparatus as claimed in claim 1, wherein the first control signal is adapted to cause activation of the electrical load and the second control signal is adapted to cause the electrical load to be maintained in an active state in response to detection of the person by the occupancy sensor.

7. The apparatus as claimed in claim 1, wherein the first control signal is adapted to cause the electrical load to be activated at a first level and the second control signal is adapted to cause the electrical load to be activated at a second level.

8. The apparatus as claimed in claim 1, wherein the first control signal is adapted to cause the electrical load to be activated in a first region of the room and the second control signal is adapted to cause the electrical load to be activated or maintained in a second region of the room.

9. The apparatus as claimed in claim 8, wherein the second region is a sub-region of the first region.

10. The apparatus as claimed in claim 8, wherein the first region substantially corresponds to the movement detection field and the second region corresponds substantially to the occupancy detection field.

11. The apparatus as claimed in claim 1, further comprising a housing, wherein the occupancy and movement sensors are provided in the housing.

12. The apparatus as claimed in claim 11, wherein the controller is provided in the housing.

13. The apparatus as claimed in claim 1, wherein the detection signal from the occupancy sensor is indicative of a location of the person within the occupancy detection field and the controller is configured to generate the second control signal in dependence on the location indicated by the detection signal sent from the occupancy sensor.

14. The apparatus as claimed in claim 1, wherein the controller is user-programmable and the apparatus further comprises an input device,
- wherein the controller is adapted to store data indicative of a priority location within the occupancy detection field in response to receiving from the input device an input signal while receiving from the occupancy sensor the detection signal indicative of the presence of the person at the priority location, and
- wherein the controller is adapted subsequently to generate the second control signal in response to receiving the detection signal from the occupancy sensor indicative of the detection of the person at the priority location.

15. An apparatus for controlling an electrical load for the environmental control of a room, the apparatus comprising:
- an occupancy sensor including a thermopile array, the occupancy sensor is responsive to the presence of a person within a detection field of the occupancy sensor;
- a user-programmable controller arranged to receive a detection signal from the occupancy sensor and to generate a control signal for the electrical load, and
- an input device,
- wherein the controller is configured to store data indicative of a priority location within the detection field of the occupancy sensor by receiving from the input device an input signal while receiving from the occupancy sensor a detection signal indicative of the presence of the person at the priority location, and
- wherein the controller is configured subsequently to generate the control signal in response to a detection signal from the occupancy sensor indicative of the detection of the person at the priority location.

16. The apparatus as claimed in claim 15, wherein the input device includes an infra-red receiver.

17. The apparatus as claimed in claim 15, wherein the controller is configured to store data indicative of the priority location within the detection field of the occupancy sensor and the controller is configured subsequently to generate the second control signal in response to a detection signal from the occupancy sensor indicative of the detection of the person at the priority location,
- wherein the controller is configured to store the data indicative of the priority location in response to repeated detection by the occupancy sensor of the person at the priority location.

18. An apparatus for controlling an electrical load of a room, the apparatus comprising:
- an occupancy sensor including a thermopile array and an occupancy detection field, the occupancy sensor is responsive to the presence of a person within the occupancy detection field; and
- a controller arranged to receive a detection signal from the occupancy sensor and to generate a control signal for the electrical load,
- wherein the controller is adapted to store data indicative of a priority location within the occupancy detection field to generate a second control signal in response to receiving the detection signal from the occupancy sensor indicative of detection of the person at the priority location,
- wherein the controller is further adapted to store the data indicative of the priority location in response to repeated detection by the occupancy sensor of the person at the priority location.

19. The apparatus as claimed in claim 18, wherein the repeated detection by the occupancy sensor includes continuous detection by the occupancy sensor of the person at the priority location over a period of time.

20. The apparatus as claimed in claim 18, wherein the repeated detection by the occupancy sensor includes continual detection by the occupancy sensor of the person at the priority location over a period of time.

21. The apparatus as claimed in claim 18, wherein the electrical load is a lighting load for a lighting system.

22. The apparatus as claimed in claim 18, wherein the electrical load includes at least one of an environmental heating system and an environmental cooling system.

* * * * *